(12) United States Patent
Mieslinger

(10) Patent No.: US 8,469,281 B2
(45) Date of Patent: Jun. 25, 2013

(54) RFID LABEL WITH SHIELDING ELEMENT

(75) Inventor: Stefan Mieslinger, Essenbach (DE)

(73) Assignee: Identive Group, Inc., Santa Ana, CA (US)

( * ) Notice: Subject to any disclaimer, the term of this patent is extended or adjusted under 35 U.S.C. 154(b) by 0 days.

(21) Appl. No.: 13/218,108

(22) Filed: Aug. 25, 2011

(65) Prior Publication Data

US 2012/0055998 A1 Mar. 8, 2012

Related U.S. Application Data

(60) Provisional application No. 61/380,627, filed on Sep. 7, 2010.

(51) Int. Cl.
*G08B 13/14* (2006.01)

(52) U.S. Cl.
USPC ............... 235/492; 340/572.5; 340/572.8

(58) Field of Classification Search
USPC ............ 235/492; 340/572.8, 572.5, 572.7
See application file for complete search history.

(56) References Cited

U.S. PATENT DOCUMENTS

| | | | |
|---|---|---|---|
| 5,912,622 A | 6/1999 | Endo et al. | |
| 7,205,899 B2 | 4/2007 | Surkau | |
| 7,315,248 B2 | 1/2008 | Egbert | |
| 2006/0055541 A1* | 3/2006 | Bleckmann | 340/572.7 |
| 2006/0266435 A1 | 11/2006 | Yang et al. | |
| 2007/0221297 A1 | 9/2007 | Matsukawa et al. | |
| 2010/0201596 A1 | 8/2010 | Mieslinger et al. | |

FOREIGN PATENT DOCUMENTS

| | | |
|---|---|---|
| EP | 1 640 893 | 3/2006 |
| WO | 2009/010294 | 1/2009 |

* cited by examiner

*Primary Examiner* — Daniel Hess
(74) *Attorney, Agent, or Firm* — Proskauer Rose LLP

(57) ABSTRACT

Described are RFID structures and methods for forming RFID structures. An RFID structure includes a loop antenna assembly, an antenna substrate supporting the loop antenna assembly, and a shielding layer parallel with a plane defined by the antenna substrate. The loop antenna assembly has a stand-alone resonant frequency of $f_1$ above or below a standardized reader frequency range. The loop antenna includes an antenna track and at least two contact pads. The loop antenna assembly in combination with the shielding layer has a resonant frequency of $f_2$ below the standardized reader frequency range. If positioned against a metallic surface, the loop antenna assembly in combination with the shielding layer has a resonant frequency within the standardized reader frequency range.

28 Claims, 6 Drawing Sheets

400a

| COVER FOIL 410 |
|---|
| TOPSIDE METALLIZATION 415 |
| ANTENNA SUBSTRATE 420 |
| BACKSIDE METALLIZATION 425 |
| SHIELDING MATERIAL 430 |

| COVER FOIL 440 |
|---|
| BRIDGE METALLIZATION 445 |
| INSULATION LAYER 450 |
| ANTENNA METALLIZATION 455 |
| ANTENNA SUBSTRATE 460 |
| SHIELDING MATERIAL 465 |

Fig. 4B

RFID LABEL WITH SHIELDING ELEMENT

RELATED APPLICATIONS

This application claims priority to and the benefit of U.S. Provisional Patent Application No. 61/380,627, filed on Sep. 7, 2010, the entire contents of which are incorporated herein by reference in their entirety.

FIELD OF THE INVENTION

The invention relates generally to RFID structures and methods for forming RFID structures.

BACKGROUND OF THE INVENTION

Radio-Frequency Identification (RFID) technology is directed to wireless communication between one object, typically referred to as a RFID tag, and another object, typically referred to as a RFID reader/writer. RFID readers/writers can generate high frequency magnetic fields, which can excite the transponder resonant circuit of the RFID tag via inductive energy transmission. RFID technology has been adopted, and is increasingly being used, in virtually every industry, including, for example, manufacturing, transportation, retail, and waste management. As such, reliable RFID systems are becoming increasingly important as the demand for RFID technology increases.

Typical reader systems for RFID labels/inlays operate at a predetermined freqeuncey (e.g., 13.56 MHz). Optimal performance of a RFID label/inlay can occur if the resonance frequency of the RFID tag is close to the predetermined frequency of the reader system. Accordingly, typical RFID tags do not achieve optimal performance when placed on metallic objects, because the high frequency alternating magnetic field generated by the reader system induces eddy currents in the electrically conductive surface of the metallic object. The eddy currents, in turn, generate an oscillating magnetic field in the opposite direction that weakens the field of the RFID tag itself.

SUMMARY OF THE INVENTION

One approach to mitigating the effects of eddy currents on the performance of RFID systems is to provide an RFID structure with a resonant frequency close to the frequency of an RFID reader when place on a metallic object. In one aspect, there is an RFID structure. The RFID structure includes a loop antenna assembly, an antenna substrate supporting the loop antenna assembly, and a shielding layer parallel with a plane defined by the antenna substrate. The loop antenna assembly has a stand-alone resonant frequency of $f_1$ above or below a standardized reader frequency range. The loop antenna includes an antenna track and at least two contact pads. The loop antenna assembly in combination with the shielding layer have a resonant frequency of $f_2$ below the standardized reader frequency range. If positioned against a metallic surface, the loop antenna assembly in combination with the shielding layer have a resonant frequency within the standardized reader frequency range.

In another aspect, there is a method of manufacturing an RFID. The method includes providing an antenna substrate and forming, on the antenna substrate, a loop antenna assembly having a stand-alone resonant frequency of $f_1$ above or below a standardized reader frequency range. The loop antenna includes an antenna track and at least two contact pads. The method also includes providing a shielding layer parallel with a plane defined by the carrier foil. The loop antenna assembly in combination with the shielding layer have a resonant frequency of $f_2$ below the standardized reader frequency range. If positioned against a metallic surface, the loop antenna assembly in combination with the shielding layer have a resonant frequency within the standardized reader frequency range.

In other examples, any of the aspects above can include one or more of the following features. The standardized reader frequency range can be defined by the International Telecommunication Union (ITU). The standardized reader frequency range can be between 13.553 MHz and 13.560 MHz. The standardized reader frequency range can have a range equal to or less than 1.0 MHz. The shielding layer can include a plurality of shielding material segments. Each shielding material segment can be spaced apart from adjacent shielding material segments. The loop antenna assembly can include one or more tuning elements. The one or more tuning elements can include one or more capacitive elements each with a capacitance value greater than 1 picofarad. The loop antenna assembly in combination with the shielding layer can have the resonant frequency within the standardized reader frequency range if positioned against a metal surface and the shielding layer is positioned between the metal surface and the antenna substrate.

In some embodiments, the RFID structure further includes a cover foil overlay. Metallization of the antenna track can be positioned between the antenna substrate and the cover foil overlay. The loop antenna assembly can further include one or more backside antenna tracks positioned on a backside surface of the antenna substrate opposite the antenna track. The shielding material can include a non-conductive material. The shielding material can include embedded soft magnetic particles, flakes, ribbons, or any combination thereof. The soft magnetic particles can include ferrites, the ferrites comprising: iron, nickel, cobalt, gadolinium, compounds of the garnet group of substances, or alloys, amorphous metals or nano-crystalline structures of any combination thereof. The RFID structure can further include an integrated circuit coupled to the at least two contact pads. The RFID structure can further include a RFID label.

In some embodiments, the method further includes positioning the RFID structure on a metallic surface of an object. The loop antenna assembly in combination with the shielding layer and the metallic surface can have the resonant frequency within the standardized reader frequency range. Providing the shielding layer can include providing a non-segmented shielding layer parallel with the plane defined by the antenna substrate. Providing the shielding layer can include etching and/or punching gaps into the non-segmented shielding layer to create spaces between the plurality of shielding material segments. The method can further include forming one or more tuning elements in the loop antenna assembly. The method can further include providing a cover foil overlay. Metallization of the antenna track can be positioned between the antenna substrate and the cover foil overlay. The method can further include forming one or more backside antenna tracks on a backside surface of the antenna substrate opposite the antenna track. The method can further include coupling an integrated circuit to the at least two contact pads.

Any of the implementations can realize one or more of the following advantages. By optimizing a RFID inlay/label (antenna and/or chip) to an exsting shielding material, the RFID performance is advantageously imporved. In addition, this approch can provide flexiblity to use any shielding material in the market to optimize the on-metal performance of an RFID label/inlay. Furthermore, the optimization of the RFID inlay/ label can compensate the negative effects of very thin shielding materials, which is beficial, for example, for applications on handheld devices where the label itself is only allowed to be slightly higher than the housing of the handheld.

The details of one or more examples are set forth in the accompanying drawings and the description below. Further features, aspects, and advantages of the invention will become apparent from the description, the drawings, and the claims. The drawings are not necessarily to scale, emphasis instead generally being placed upon illustrating the principles of the invention.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIGS. 4A-4B are cross-sectional side-views of RFID structures.

DETAILED DESCRIPTION

The present invention describes an improvement of the performance of RFID structures (e.g., RFID inlays, RFID labels) that use shielding material. In some embodiments in which the RFID structure is intended to be placed on a metallic object, optimization of RFID performance is achieved by tuning the RFID structure, including the antenna assembly and shielding layer, to closely align with a predetermined frequency range used by an RFID reader.

Figure 1A:
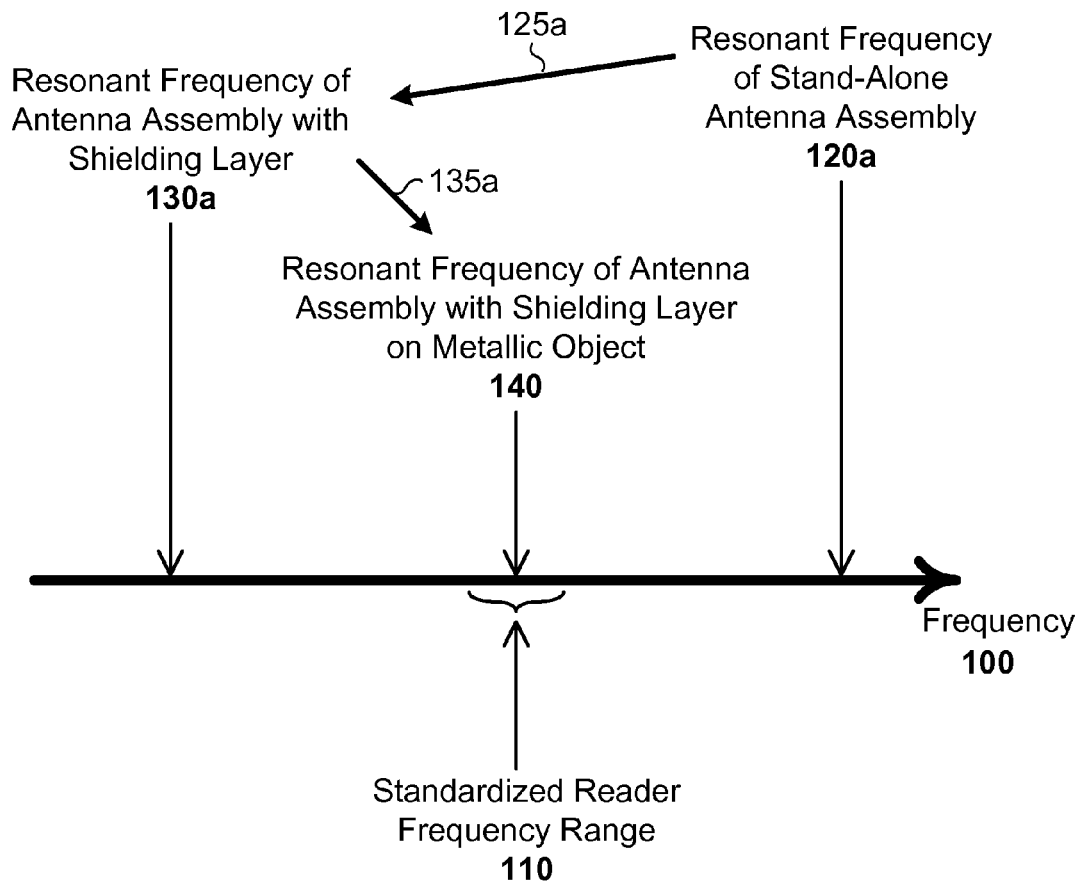
FIGS. 1A-1B are graphs illustrating resonant frequencies along a frequency axis.
Figure 1B:
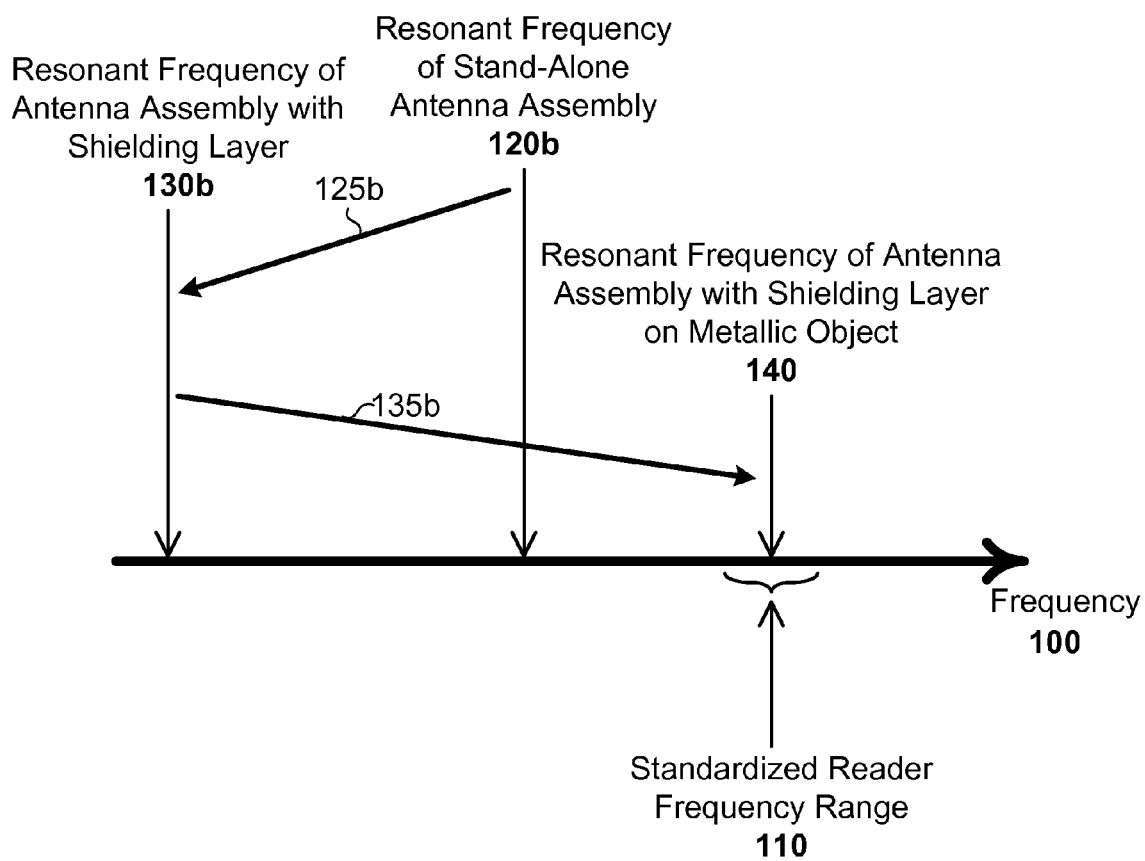

FIGS. 1A-1B are graphs illustrating resonant frequencies along a frequency axis 100. A RFID reader can generate alternating fields with a frequency within a predetermined frequency range 110. In some embodiments, the predetermined frequency range 110 conforms with one or more promulgated standards. For example, the International Telecommunication Union (ITU) Radiocommunication Sector (ITU-R) defines industrial, scientific and medical (ISM) radio bands for specific purposes. Examples of ISM bands used for RFID applications are: 6.765-6.795 MHz, 13.553-13.567 MHz, 26.957-27.283 MHz, 433.050-434.790 MHz, 868-870 MHz, 2.400-2.4835 GHz, and 5.725-5.875 GHz. In general, a standardized frequency range for RFID applications can be promulgated by any authorized agency (e.g., the Federal Communications Commission (FCC) of the United States, the European Communications Office (ECO), the European Conference of Postal and Telecommunications Administration (CEPT), the European Telecommunications Standards Institute (ETSI), the American National Standards Institute (ANSI), the International Organization for Standardization (ISO), or other standards organization.

FIG. 1A illustrates that a stand-alone antenna assembly has a characteristic resonant frequency 120a above the predetermined frequency range 110 (e.g., by at least 500 kHz). When a particular shield material and configuration is included with the stand-alone antenna assembly, the resonant frequency 130a of the combined structure is shifted 125a below the stand-alone frequency 120a and is below the predetermined frequency range 110. When the combination of the antenna assembly and the shielding material are positioned on a metallic object, the resonant frequency will shift 135a up to align with the predetermined frequency range 110.

In one embodiment, for example, an RFID reader operates at a standardized frequency 110 of 13.56 MHz. The application can require that the RFID structure (e.g., inlay or label) be applied to a metallic surface using a predetermined shielding material. The stand-alone frequency 120a of the RFID antenna assembly is designed to be 14.8 MHz. When the shielding material is added to the RFID antenna assembly, the resonance frequency is shifted 125a to 12.6 MHz. However, when this RFID antenna assembly with shielding is placed on the metallic object, then the RFID structure's resonance frequency is shifted 135a to align with 13.56 MHz.

FIG. 1B illustrates that a stand-alone antenna assembly has a characteristic resonant frequency 120b below the predetermined frequency range 110 (e.g., by at least 500 kHz). When a particular shield material and configuration is included with the stand-alone antenna assembly, the resonant frequency 130b of the combined structure is shifted 125b below the stand-alone frequency 120b. When the combination of the antenna assembly and the shielding material are positioned on a metallic object, the resonant frequency will shift 135b up to align with the predetermined frequency range 110.

In one embodiment, for example, an RFID reader operates at a standardized frequency 110 of 13.56 MHz. The application can require that the RFID structure (e.g., inlay or label) be applied to a metallic surface using a predetermined shielding material. The stand-alone frequency 120b of the RFID antenna assembly is designed to be 13.0 MHz. When the shielding material is added to the RFID antenna assembly, the resonance frequency is shifted 125b to 11.5 MHz. However, when this RFID antenna assembly with shielding is placed on the metallic object, then the RFID structure's resonance frequency is shifted 135b to align with 13.56 MHz.

Accordingly, taking into account the radiofrequency (RF) properties with a particular shielding material and configuration of the shielding layer (e.g., thickness), advantageously allows a stand-alone RFID antenna assembly to be created with a stand-alone resonance frequency 120a or 120b not equal to the predetermined frequency 110 of the RFID reader, but when combined with a shielding material and metallic object has a resonance frequency 140 that aligns with the RFID reader's frequency 110.

Metallic objects can include surfaces that are made of metal, are metallized, are metal-coated sputtered, and/or any other surface that causes eddy currents (e.g., alloys, grpahite, surfaces). In addition to application to metallic objects, the technique illustrated in FIG. 1 can be used where RFID structures are to be placed on devices with a non-conductive surface, but still experience diminished performance due to eddy currents caused by conductive material located below the non-conductive surface (e.g., insulation layer).

Figure 2A:
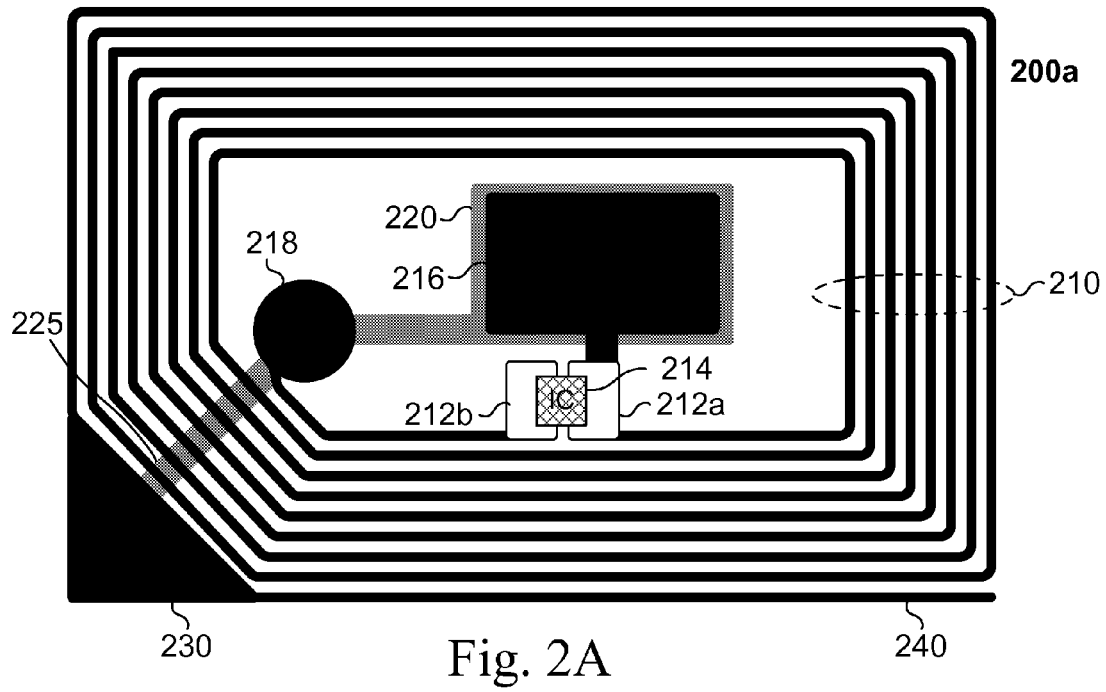
FIGS. 2A-2B are top- and bottom-views of a double-sided antenna RFID structure.
Figure 2B:
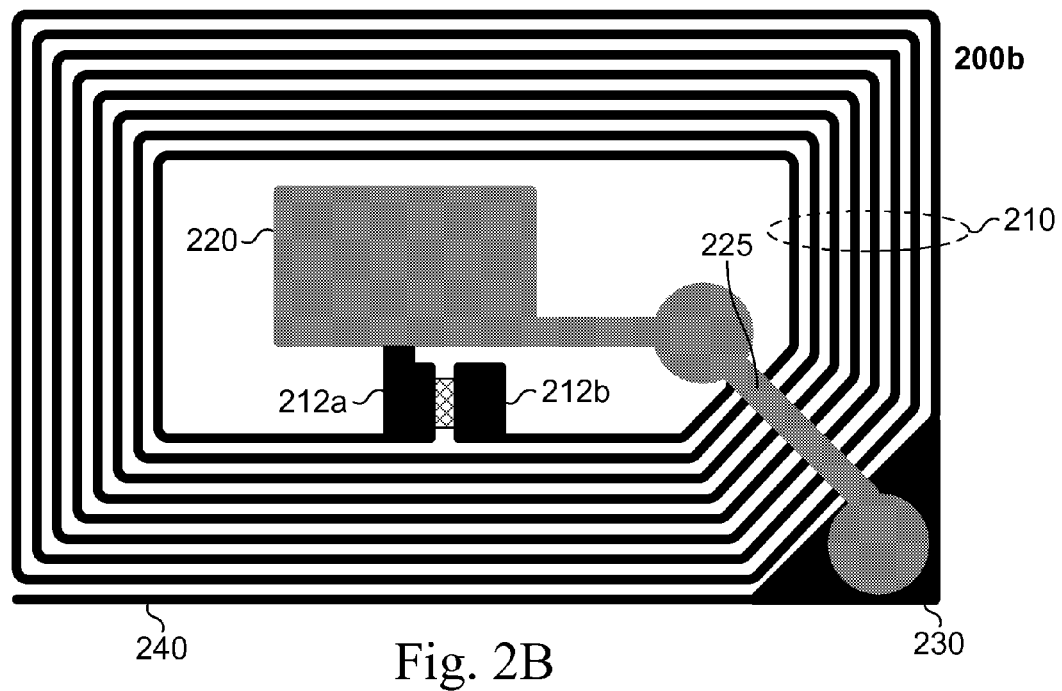

RFID structures typically include two components: a RFID antenna assembly and an RFID integrated circuit (IC). In some applications, the RFID chip can function as a memory device, a security device, and/or an identification component. FIGS. 2A-2B include top-view 200a and a bottom-view 200b of a double-sided antenna RFID structure. Antenna assembly includes a plurality of antenna loop windings 210, two contact pads 212a and 212b for connecting to IC chip 214, a capacitor tuning element (including top element 216 and bottom element 220), cross-over points 218 and 230, a cross-over track 225, and a inductive tuning element 240. RFID antennas can be used to receive and/or transmit an electromagnetic signal from a RFID reader/writer. A RFID IC (sometimes referred to as a RFID chip) can be used to store and/or process information (e.g., modulate/demodulate a radio-frequency (RF) signal).

Figure 3A:
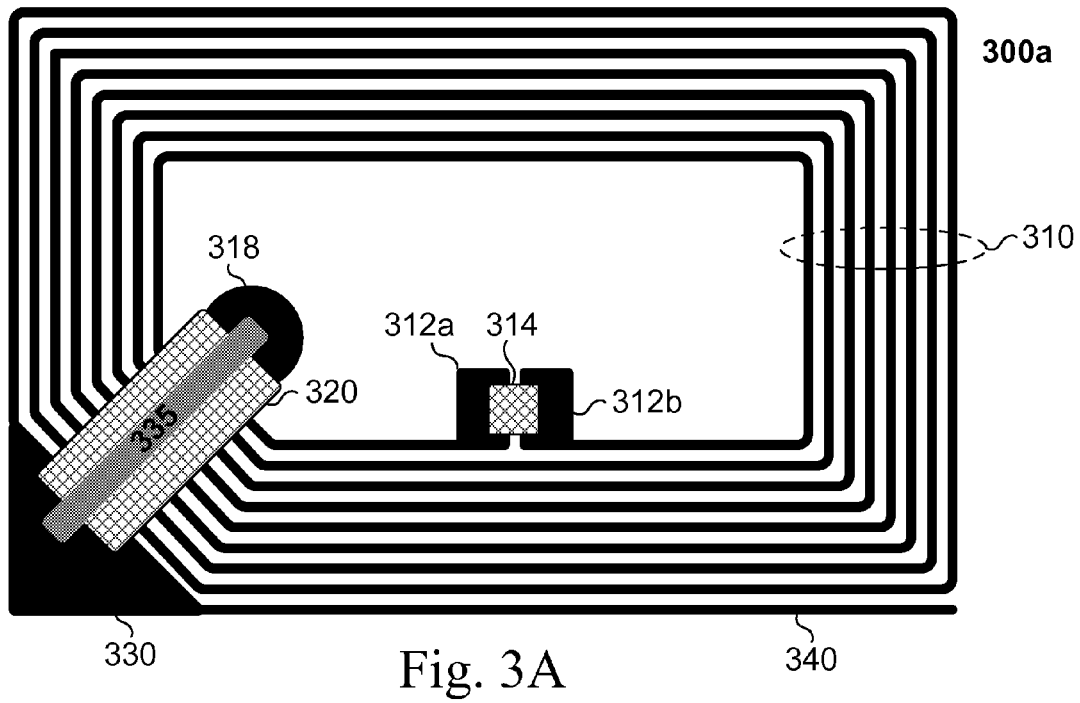
FIGS. 3A-3B are top- and bottom-views of a single-sided antenna RFID structure.
Figure 3B:
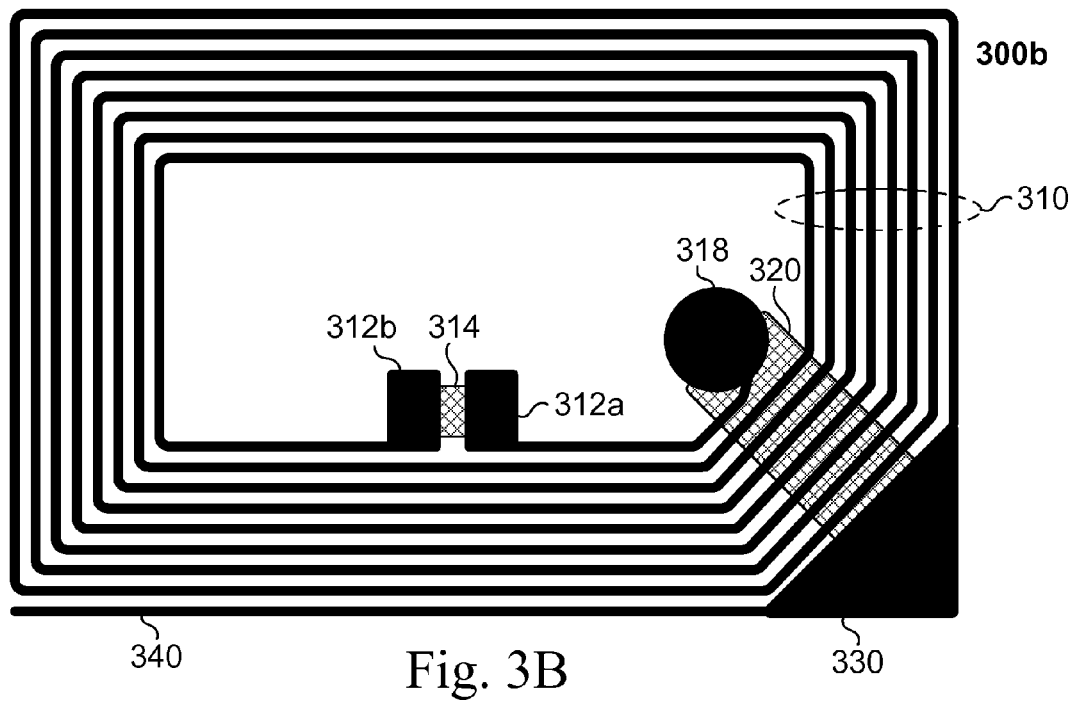

FIGS. 3A-3B include top-view 300a and a bottom-view 300b of a single-sided antenna RFID structure. Antenna assembly includes a plurality of antenna loop windings 310, two contact pads 312a and 312b for connecting to IC chip 314, bridge points 318 and 330, a dielectric layer 320, a cross-over track 335, and a inductive tuning element 340.

FIGS. 4A-4B are cross-sectional side-views of RFID structures 400a and 400b. RFID structure 400a illustrates a double-sided antenna structure that includes a cover foil layer 410 (e.g., a protective layer), a topside antenna metallization layer 415, an antenna substrate 420, and a backside antenna metallization layer 425, and/or a shielding material layer 430. In some embodiments, the topside antenna metallization layer 415 includes antenna loop windings, capacitive elements, contact pads, and/or an IC module, while the backside antenna metallization layer 425 includes a cross-over track. The backside antenna metallization layer 425 can be electrically coupled to the topside metallization layer 415 via one or more cross-over points (e.g., 218 and 230) that go through the antenna substrate 420. RFID structure 400b illustrates a single-sided antenna structure that includes a cover foil layer 440 (e.g., a protective layer), a bridge metallization layer 445, an insulation layer 450, an antenna metallization layer 455, an antenna substrate 460, and/or a shielding material layer 465.

In some embodiments, the order of layers within RFID structures 400a or 400b can be reversed. For example, RFID structure 400a can have the topside metallization 415 located between the antenna substrate 420 and the shielding material 430 while the backside metallization 425 is located between the antenna substrate 420 and the cover foil 410. Similarly, RFID structure 400b can have the cover foil 440 adjacent to the antenna substrate 460 while the shielding material is adjacent to the bridge metallization 445. By positioning the antenna substrate 420/460 to be between the topside metallization 415/antenna metallization layer 455 and the cover foil 440, the IC module can advantageously be better protected from mechanical damage.

In some embodiments, antenna substrates 420/460 includes a carrier foil made of any combination of: PET, PET-G, PP, PE, PI, PVC, PBT, LCP, ABS, PEN, glass fiber, epoxy, BT, and/or PC. In some embodiments, the bridge metallization layer 445 includes a cross-over track (e.g., 335). In some embodiments, the insulation layer 450 can be about the same size in area as the bridge metallization layer 445. An adhesive layer (not shown) can also be applied to any of the outermost layers on the RFID structure.

Shielding material can include a non-conductive film and/or matrix (e.g., plastic, rubber and/or the like), which, in turn, can include embedded soft magnetic particles (e.g., ferrites). Shielding materials can also include high permeable alloys, amorphous alloys, nano-crystalline materials, soft magnetic materials, and/or ferrite-based materials. The characteristics of the shielding material (e.g., the amount, size and permeability of the ferrite particles, and/or the thickness of the whole compound material) can determine the shielding properties. The area of the shielding material can be larger than the area of the antenna.

The performance of RFID structures can be optimized for particular applications by changing the characteristics of the shielding layer (e.g., using different films for building the shielding layer). For example, using the same RFID structure, different shielding layers can be designed to optimize for different objects that the RFID structure will be applied to. This approch can be time consuming and inefficient, because it requires the lamination of different layers of films. In addition, a thickness of 0.3-0.8 mm for the shielding is typically required. For many applications, a thickness of 0.3-0.8 mm is considered too thick and not flexible enough from a mechanical point of view.

Numerous applications require thin and flexible RFID transponders (e.g., applications on hand-held devices, spare parts, devices which are themselves flexible and/or which show cylindrical geometry). The use of thin shielding elements (e.g., less than 400 μm thick), therefore, is advantageous in these types of applications that require mechanical flexibility. In some embodiments, the shielding elements are 100 μm or 250 μm thick. However, thin shielding elements can result in the amount of shielding material being low and the distance between the RFID antenna assembly and the metalized surface being small. As a consequence, the influence of eddy currents and the resulting opposing field on the RFID antenna assembly can be significant. To at least partially compensate for the eddy current effect, the antenna assembly can be configured with different characteristics.

As illustrated in FIG. 1, when a RFID antenna assembly (with or without shielding) is in close distance to metallic surfaces, an electrical de-tuning of the resonant frequency occurs, which results in a shift of the RFID structure's resonance frequency towards higher or lower values (depending on shielding material, chip, antenna configuration etc.). Any de-tuning results in a further degradation of the RFID structure's RF signal strength (read/data transmission range) due to a non-resonant energy transfer between the RFID structure and the RFID reader. In order to compensate the resonance frequency, the antenna assembly can be designed to have a different starting resonant frequency and/or the characteristics of the shielding material and/or configuration can be modified to change the resonant frequency.

In some embodiments, inductive and/or capacitive elements can be added to the RFID antenna assembly, which result in decreasing or increasing the resonance frequency. In supplemental or alternative embodiments, inductive and/or capacitive elements can be removed from the RFID label/inlay resulting in a shift to a higher/lower frequency range. An inductive element can be, for example, the coil of the RFID antenna including a certain number of turns with a certain track width and spacing between the tracks. Tuning using inductance can be achieved, for example, by changing the antenna dimensions, track geometry, track dimensions, spacing between tracks, number of tracks and/or adding/eliminating turns or partial turns which are not part of the original resonance circuit of the RFID antenna. For example, inductive tuning elements 240 and 340 are partial turns of the antenna assembly that can be added or removed to tune inductance.

In some embodiments, the capacitive element can be, for example, a capacitor of the RFID antenna (e.g., elements 216 and 220). Tuning using capacitance can be achieved, for example, by changing the antenna's area, the PET-thickness, spacing between the tracks (parasitic capacitance) and/or by adding/reducing metalized areas (parasitic capacitance). In alternative and/or supplemental embodiments, the chip attached the antenna and/or other external components (e.g. surface mounted devices, batteries, displays etc.) can also have their inductance and/or capacitance values modified for tuning reasons.

The application of shielding material to a RFID antenna assembly can result in a dampening of the RFID signal. As illustrated in FIG. 1, depending on the shielding material, a frequency detuning of the stand-alone RFID antenna assembly can occur. If the antenna assembly with shielding is applied to or in close proximity to a metallic surface (or a device causing eddy currents), then further dampening and/or de-tuning can occur. The performance of RFID structure can advantageously be improved with these types of shielding layers by using antennas with higher conductivity (less ohmic losses) and/or thicker antenna carrier material. Thicker carrier material has the advantage of building a larger distance between the antenna coils and shielding element/metal surface. A larger distance can reduce the parasitic capacitor formed between antenna metallization and shielding and/or metal device. A larger distance between an antenna coil and shielding element can decrease the parasitic inductance and/or its permeability formed by adding the shielding layer to the stand-alone antenna assembly. In addition, changing the carrier material thickness and/or using a carrier foil consisting of so-called low k-material can also reduce the parasitic capacitance. Furthermore, antennas with double sided coils can be used, which can help increase the inductance of the whole RFID structure and optimize the transponder's signal strength. Also in this case, further tuning of the double-coil antenna can result by adding/reducing capacitive and/or inductive elements.

Figure 5A:
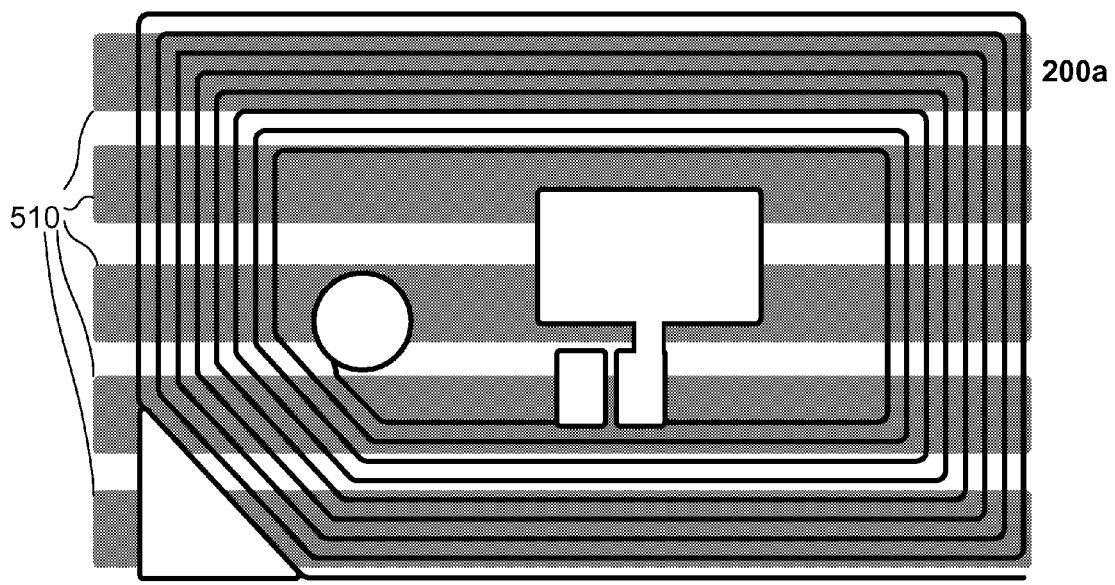
FIGS. 5A-5B are top views of a RFID structure with different shielding layer configurations.
Figure 5B:
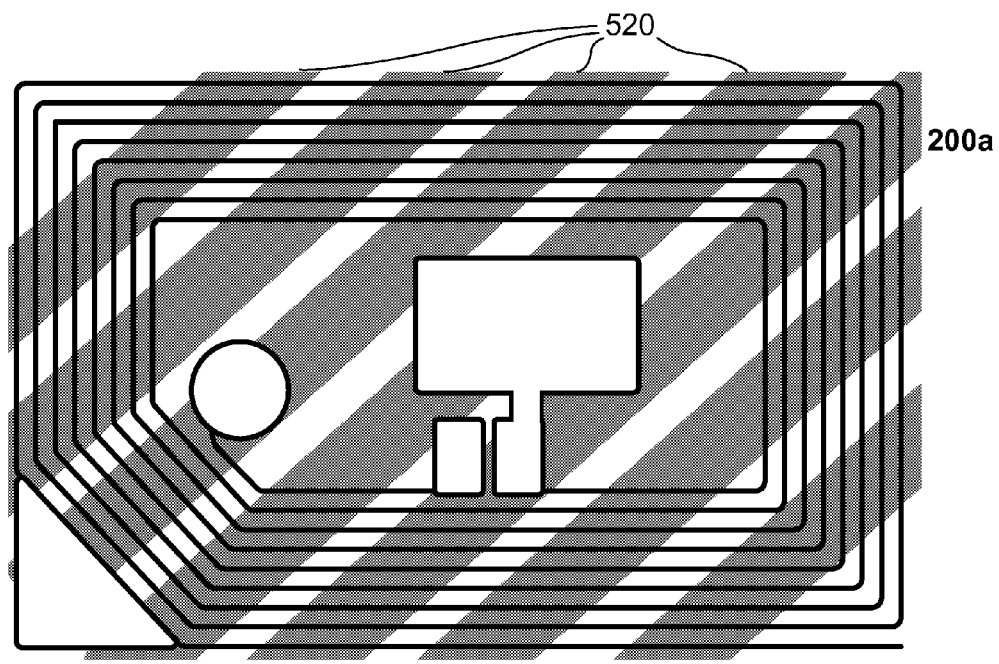

In another aspect, shielding material (e.g., a ferrite-based absorber) can be applied in different geometrical configurations (e.g., as strips, waves, rings, or other non-rectangular shape). FIGS. 5A-5B are top views 500a and 500b of a RFID structure 200a with different shielding layer configurations 510 and 520. Use of different geometrical configurations of the shielding layer can advantageously limit damping and/or detuning of the RFID inlay/label by the shielding material itself. Such a specially shaped shielding material can provide more flexibility during antenna tuning. In general, any geometry (e.g., lines, waves, grids, etc.) of shielding elements can advantageously be created using laser cutting, punching, and/or etching in order to change the dampening characteristics of the shielding layer. Other geometries like lines, grids and/or the like can be formed by laser cutting, laser engraving, punching, and/or etching methods.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A RFID structure comprising:
a loop antenna assembly having a stand-alone resonant frequency of $f_1$ above or below a standardized reader frequency range, the loop antenna including an antenna track, and at least two contact pads;
an antenna substrate supporting the loop antenna assembly; and
a shielding layer parallel with a plane defined by the antenna substrate, the loop antenna assembly in combination with the shielding layer having a resonant frequency of $f_2$ below the standardized reader frequency range, wherein the shielding layer includes a plurality of shielding material segments, each shielding material segment being spaced apart from adjacent shielding material segments, the spaces created by etching or punching gaps in the shielding layer,
wherein, if positioned against a metallic surface, the loop antenna assembly in combination with the shielding layer has a resonant frequency within the standardized reader frequency range.

2. The RFID structure of claim 1, wherein the standardized reader frequency range is defined by the International Telecommunication Union (ITU).

3. The RFID structure of claim 2, wherein the standardized reader frequency range is between 13.553 MHz and 13.560 MHz.

4. The RFID structure of claim 1, wherein the standardized reader frequency range has a range equal to or less than 1.0 MHz.

5. The RFID structure of claim 1, wherein the loop antenna assembly includes one or more tuning elements.

6. The RFID structure of claim 5, wherein the one or more tuning elements comprises one or more capacitive elements each with a capacitance value greater than 1 picofarad.

7. The RFID structure of claim 1, wherein the loop antenna assembly in combination with the shielding layer has the resonant frequency within the standardized reader frequency range if positioned against a metal surface and the shielding layer is positioned between the metal surface and the antenna substrate.

8. The RFID structure of claim 1 further comprising a cover foil overlay, wherein metallization of the antenna track is positioned between the antenna substrate and the cover foil overlay.

9. The RFID structure of claim 1, wherein the loop antenna assembly further includes one or more backside antenna tracks positioned on a backside surface of the antenna substrate opposite the antenna track.

10. The RFID structure of claim 1, wherein the shielding material comprises a nonconductive material.

11. The RFID structure of claim 10, wherein the shielding material includes embedded soft magnetic particles, flakes, ribbons, or any combination thereof.

12. The RFID structure of claim 11, wherein the soft magnetic particles comprise ferrites, the ferrites comprising: iron, nickel, cobalt, gadolinium, compounds of the garnet group of substances, or alloys, amorphous metals or nano-crystalline structures of any combination thereof.

13. The RFID structure of claim 1, further comprising an integrated circuit coupled to the at least two contact pads.

14. The RFID structure of claim 1, wherein the RFID structure comprises a RFID label.

15. A method of manufacturing an RFID structure, the method comprising:
providing an antenna substrate;
forming, on the antenna substrate, a loop antenna assembly having a stand-alone resonant frequency of $f_1$ above or below a standardized reader frequency range, the loop antenna including an antenna track, and at least two contact pads; and
providing a shielding layer parallel with a plane defined by the antenna substrate, the loop antenna assembly in combination with the shielding layer having a resonant frequency of $f_2$ below the standardized reader frequency range, wherein providing the shielding layer comprises:
providing a non-segmented shielding layer parallel with the plane defined by the antenna substrate; and
etching or punching gaps into the non-segmented shielding layer to create spaces between a plurality of shielding material segments, each shielding material segment being spaced apart from adjacent shielding material segments, wherein, if positioned against a metallic surface, the loop antenna assembly in combination with the shielding layer has a resonant frequency within the standardized reader frequency range.

16. The method of claim 15, further comprising positioning the RFID structure on a metallic surface of an object, wherein the loop antenna assembly in combination with the shielding layer and the metallic surface has the resonant frequency within the standardized reader frequency range.

17. The method of claim 15, wherein the standardized reader frequency range is defined by the International Telecommunication Union (ITU).

18. The method of claim 17, wherein the standardized reader frequency range is between 13.553 MHz and 13.560 MHz.

19. The method of claim 15, wherein the standardized reader frequency range has a range equal to or less than 1.0 MHz.

20. The method of claim 15, further comprising forming one or more tuning elements in the loop antenna assembly.

21. The method of claim 20, wherein the one or more tuning elements comprises one or more capacitive elements each with a capacitance value greater than 1 picofarad.

22. The method of claim 15, further comprising providing a cover foil overlay, wherein metallization of the antenna track is positioned between the antenna substrate and the cover foil overlay.

23. The method of claim 15, further comprising forming one or more backside antenna tracks on a backside surface of the antenna substrate opposite the antenna track.

24. The method of claim 15, wherein the shielding material comprises a non-conductive material.

25. The method of claim 24, wherein the shielding material includes embedded soft magnetic particles, flakes, ribbons, or any combination thereof.

26. The method of claim 25, wherein the soft magnetic particles comprise ferrites, the ferrites comprising: iron, nickel, cobalt, gadolinium, compounds of the garnet group of substances, or alloys, amorphous metals or nano-crystalline structures of any combination thereof.

27. The method of claim 15, further comprising coupling an integrated circuit to the at least two contact pads.

28. The method of claim 15, wherein the RFID structure comprises a RFID label.

* * * * *